(12) United States Patent
Robotham

(10) Patent No.: US 7,664,115 B1
(45) Date of Patent: Feb. 16, 2010

(54) METHOD AND APPARATUS FOR MERGING VIRTUAL CONNECTIONS

(75) Inventor: Robert E. Robotham, Ottawa (CA)

(73) Assignee: Alcatel-Lucent Canada, Inc., Kanata, ON (CA)

( * ) Notice: Subject to any disclaimer, the term of this patent is extended or adjusted under 35 U.S.C. 154(b) by 0 days.

(21) Appl. No.: 09/495,207

(22) Filed: Jan. 31, 2000

Related U.S. Application Data

(63) Continuation-in-part of application No. 09/303,352, filed on Apr. 30, 1999, now Pat. No. 6,510,158.

(51) Int. Cl.
*H04L 12/56* (2006.01)

(52) U.S. Cl. .................. 370/395.43; 370/412

(58) Field of Classification Search ......... 370/292–232, 370/235–238.1, 392, 395.1, 396–397, 395.2, 370/395.41–395.43, 395.7, 395.71, 409, 370/415

See application file for complete search history.

(56) References Cited

U.S. PATENT DOCUMENTS

| | | | |
|---|---|---|---|
| 5,592,476 A * | 1/1997 | Calamvokis et al. | 370/390 |
| 5,649,108 A | 7/1997 | Spiegel et al. | |
| 5,689,500 A * | 11/1997 | Chiussi et al. | 370/235 |
| 5,689,505 A * | 11/1997 | Chiussi et al. | 370/388 |
| 5,689,506 A * | 11/1997 | Chiussi et al. | 370/388 |
| 5,757,770 A | 5/1998 | Lagoutte et al. | |
| 5,768,271 A | 6/1998 | Seid et al. | |
| 5,777,984 A * | 7/1998 | Gun et al. | 370/230 |
| 5,793,748 A | 8/1998 | Murase | |
| 5,812,527 A * | 9/1998 | Kline et al. | 370/232 |
| 5,832,197 A | 11/1998 | Houji | |
| 5,838,681 A * | 11/1998 | Bonomi et al. | 370/395.41 |
| 5,870,384 A | 2/1999 | Salovuori et al. | |
| 5,926,459 A | 7/1999 | Lyles et al. | |
| 5,956,334 A * | 9/1999 | Chu et al. | 370/395.2 |
| 5,959,993 A | 9/1999 | Varma et al. | |
| 6,026,090 A * | 2/2000 | Benson et al. | 370/395.7 |
| 6,091,708 A | 7/2000 | Matsunuma | |
| 6,104,715 A * | 8/2000 | Basso et al. | 370/397 |
| 6,148,000 A * | 11/2000 | Feldman et al. | 370/397 |
| 6,148,001 A * | 11/2000 | Soirinsuo et al. | 370/395.4 |

(Continued)

*Primary Examiner*—Ayaz R Sheikh
*Assistant Examiner*—Timothy J Weidner
(74) *Attorney, Agent, or Firm*—Ross D. Snyder & Associates Inc.

(57) ABSTRACT

A method and apparatus for merging a plurality of virtual connections to form a merged virtual connection is presented. As cells for each of the plurality of virtual connections are received, they are buffered into a corresponding plurality of cell buffers, where each virtual connection has a corresponding cell buffer. When enough cells to constitute a complete packet are buffered for a particular virtual connection in its corresponding cell buffer, the identity of that virtual connection is queued into a queue, which may take the form of a linked list. A plurality of linked lists may be included such that differentiation between various virtual connections based on class is possible, where the class division may be based on a number of different factors. Prioritization information for the merged virtual connection is then obtained, where in the case where a plurality of classes are supported, the prioritization information includes class prioritization information. A cell stream for the merged virtual circuit is then generated based on the prioritization information and the virtual connection identities currently stored in the queue structure. The cell stream is generated such that entire packets are included in the cell stream in a continuous manner and no intermingling of cells corresponding to different packets occurs.

33 Claims, 4 Drawing Sheets

U.S. PATENT DOCUMENTS

| | | | |
|---|---|---|---|
| 6,154,459 A * | 11/2000 | Wicklund | 370/230.1 |
| 6,195,355 B1 * | 2/2001 | Demizu | 370/397 |
| 6,243,381 B1 * | 6/2001 | Cai et al. | 370/392 |
| 6,304,549 B1 | 10/2001 | Srinivasan et al. | |
| 6,490,248 B1 * | 12/2002 | Shimojo | 370/229 |
| 6,496,479 B1 | 12/2002 | Shionozaki | |
| 6,510,158 B1 * | 1/2003 | Robotham et al. | 370/399 |
| 6,512,744 B1 * | 1/2003 | Hughes et al. | 370/232 |
| 6,614,794 B1 * | 9/2003 | Adas et al. | 370/399 |
| 6,618,378 B1 * | 9/2003 | Giroux et al. | 370/395.1 |
| 6,636,512 B1 * | 10/2003 | Lorrain et al. | 370/392 |
| 6,643,293 B1 | 11/2003 | Carr et al. | |
| 6,661,775 B1 | 12/2003 | Nakayama et al. | |
| 6,704,321 B1 * | 3/2004 | Kamiya | 370/412 |
| 6,760,336 B1 | 7/2004 | Mangin et al. | |
| 6,781,994 B1 * | 8/2004 | Nogami et al. | 370/395.1 |
| 6,876,659 B2 * | 4/2005 | Aznar et al. | 370/395.1 |
| 6,934,296 B2 * | 8/2005 | Shimojo | 370/428 |
| 6,963,585 B1 * | 11/2005 | Le Pennec et al. | 370/468 |
| 6,967,927 B1 * | 11/2005 | Dugeon et al. | 370/236.1 |
| 7,177,279 B2 * | 2/2007 | Kataria | 370/235 |
| 7,177,317 B2 * | 2/2007 | Bonomi et al. | 370/412 |
| 7,385,967 B2 * | 6/2008 | Nagami et al. | 370/356 |
| 2001/0007561 A1 * | 7/2001 | Aznar et al. | 370/409 |
| 2001/0036189 A1 * | 11/2001 | Cai et al. | 370/395 |
| 2003/0133411 A1 * | 7/2003 | Ise et al. | 370/230 |

\* cited by examiner

METHOD AND APPARATUS FOR MERGING VIRTUAL CONNECTIONS

RELATED APPLICATIONS

This application is a continuation-in-part application of an application entitled "METHOD AND APPARATUS COMBINING A PLURALITY OF VIRTUAL CIRCUITS INTO A COMBINED VIRTUAL CIRCUIT" which was filed on Apr. 30, 1999 now U.S. Pat. No. 6,510,158 and which has a Ser. No. 09/303,352.

FIELD OF THE INVENTION

The invention relates generally to communications and more particularly to a method and apparatus for merging virtual connections in communication systems.

BACKGROUND OF THE INVENTION

Communication networks are known to include a plurality of communication switches interoperably coupled to provide communication links between end users. Such end users are coupled to the communication network via ports associated with the plurality of switches. The users may be individual users such as personal computers, telephones, videophones, facsimile machines, etc. The users may also be other network components such as servers, routers, private branch exchanges (PBX), etc. The communication network may also include a network manager that manages the establishment of communication links and overall operation of the communication system.

As is known, to establish a communication path between ports of different switches communication links between the endpoint switches and intervening switches need to be established. As is also known, each port within a switch may support multiple communications between users that traverse the same path over one or more links. The communications supported in the network may be virtual connections (VCs), which are also referred to as virtual circuits and which may include virtual path connections (VPCs) and virtual channel connections (VCCs). Each individual virtual connection is identified by a virtual connection identifier (VCI). In order to reduce the amount of state information required to be maintained by intervening switches, paths of the multiple communications supported by a single port may be aggregated to form a virtual path aggregation. Within the virtual path aggregation, each of the virtual connections maintains its own unique identity through the use of its VCI. As such, at the terminating end of the virtual path (VP) aggregation, each of the individual virtual connections (VCs) can be reconstructed based on the VCI included within each cell.

Another technique that enables multiple virtual connections to traverse the network in a simplified manner is accomplished through virtual connection merging. When a virtual connection merge operation is performed, multiple virtual connections are combined into a single virtual connection that has a single unique virtual connection identifier that corresponds to the merged virtual connection. As such, the individual cells carried across the merged virtual connection do not include the VCIs that identify them as corresponding to a particular virtual connection that has been merged into the merged virtual connection. As such, the cells within a particular packet for a virtual connection must be sent in a sequential manner such that no intermingling of cells from different packets corresponding to different virtual connections occurs.

Because the bandwidth available for transporting data within a merged virtual connection is limited, there are numerous issues that arise regarding prioritization of data transmission such that different qualities and classes of service may be supported. Therefore, a need exists for a method and apparatus that supports virtual connection merging and allows for prioritization of available bandwidth.

DETAILED DESCRIPTION OF A PREFERRED EMBODIMENT OF THE INVENTION

Generally, the present invention provides a method and apparatus for merging a plurality of virtual connections to form a merged virtual connection. As cells for each of the plurality of virtual connections are received, they are buffered into a corresponding plurality of cell buffers, where each virtual connection has a corresponding cell buffer. When the cells that constitute a complete packet are buffered for a particular virtual connection in its corresponding cell buffer, the identity of that virtual connection is queued into a queue, which may take the form of a linked list. A plurality of linked lists may be included such that differentiation between various virtual connections based on class is possible, where the class division may be based on a number of different factors. Prioritization information for the merged virtual connection is then obtained, where in the case where a plurality of classes are supported, the prioritization information includes class prioritization information. A cell stream for the merged virtual circuit is then generated based on the prioritization information and the virtual connection identities currently stored in the queue structure. The cell stream is generated such that entire packets are included in the cell stream in a continuous manner and no intermingling of cells corresponding to different packets occurs. Cells of the merged virtual circuit may be intermingled with cells of other unrelated virtual circuits.

By maintaining a queue structure that differentiates between multiple virtual connection classes, numerous bandwidth allocation options are presented. The bandwidth percentage allocated to each class may be delineated based on a number of packets or a number of cells allotted to each class in an interval. By assigning different virtual connections to different classes and partitioning the available bandwidth on the merged virtual connection based on class, the bandwidth available is allocated in an efficient manner that ensures proper prioritization of data transmissions.

Figure 1:
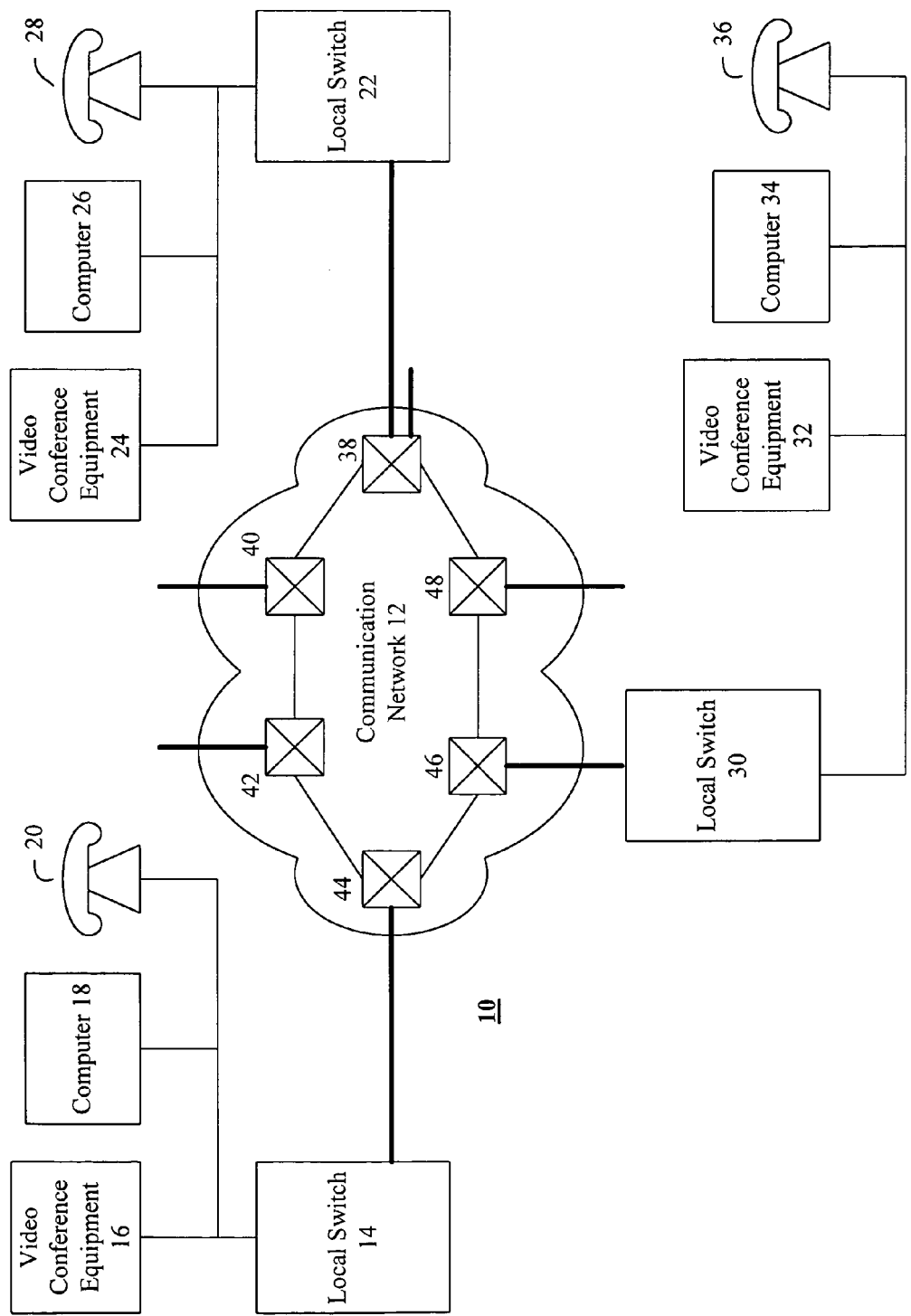
FIG. 1 illustrates a block diagram of a communications network in accordance with the present invention.

The invention can be better understood with reference to FIGS. 1-5. FIG. 1 illustrates a block diagram of a communication system 10 that includes a communication network 12 and local switches 14, 22, and 30. The communication network 12 includes a plurality of switches that are interoperably coupled to provide communication paths between various nodes within the communication network 12, where the nodes are accessible external to the communication network 12. The switches 38, 40, 42, 44, 46, and 48 of the communication network 12 may process data using various protocols, including frame relay protocol, internet protocol (IP), ATM protocol, or any combination thereof.

The local switches 14, 22, and 30 are operably coupled to a plurality of end users. Each of the end users may include video conferencing equipment 16, 24, and 32, computers 18, 26, and 34, or telephones 20, 28 and 30, and 36. The end user equipment may also include facsimile machines, printers, web browsers, etc. Each of the local switches 14, 22, and 30 may be a network component such as a server, router, PBX structure, etc.

Figure 2:
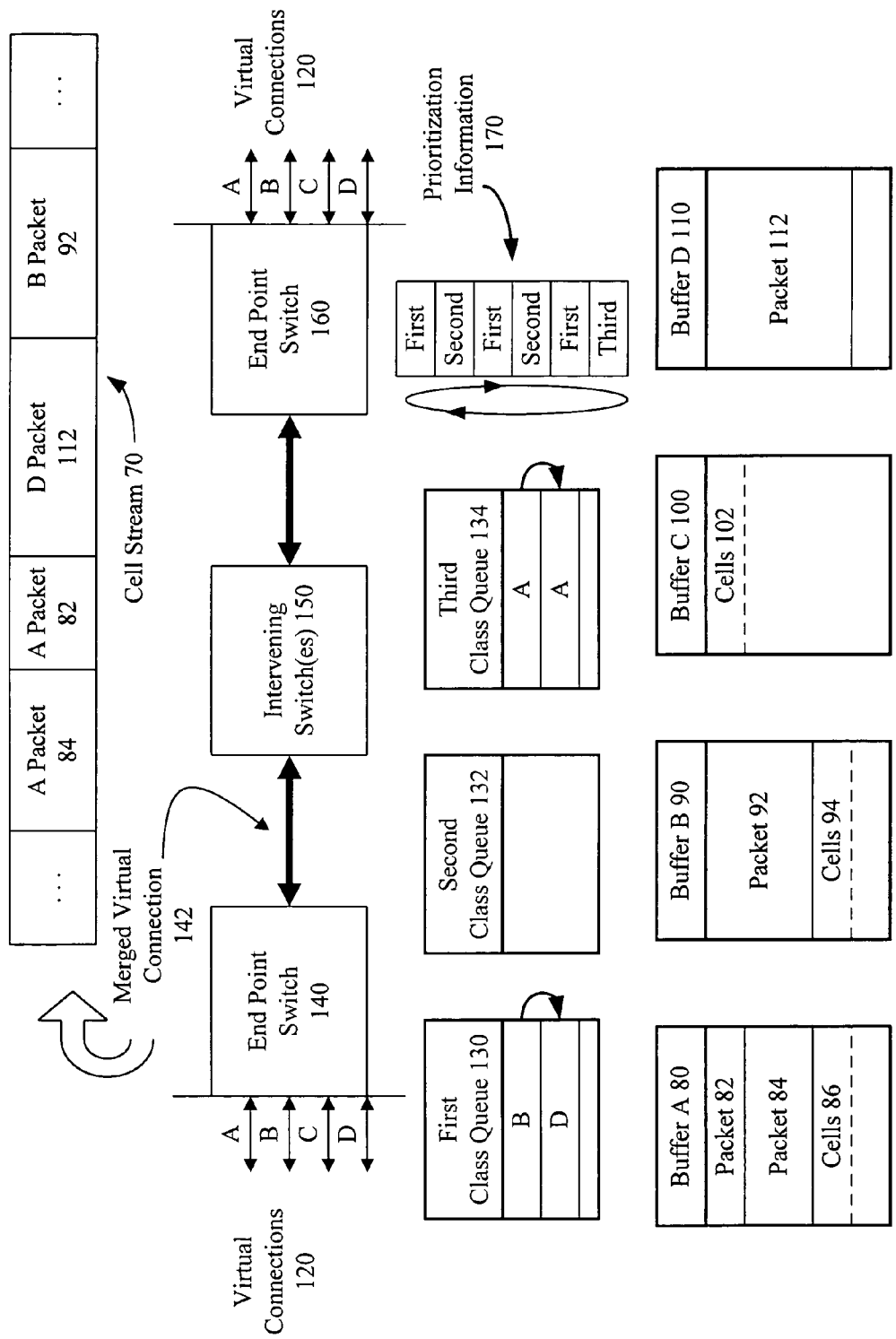
FIG. 2 illustrates a graphical representation of combining a plurality of virtual connections to produce a merged virtual connection in accordance with a particular embodiment of the present invention.

In order to support the virtual connection merging function, a portion of the switches included in the network 10 of FIG. 1 include systems that include components illustrated in FIG. 2 that permit multiple virtual connections to be merged to form a merged virtual connection. For example, if multiple virtual connections exist within the network 10 that traverse the communication network 12 along a shared path through a portion of the switches 38, 40, 42, 44, 46, and 48, the multiple virtual connections that share this path may be merged prior to traversing the shared portion such that, with regard to the switches along the shared path, only a single virtual connection appears to exist. This reduces the overhead associated with transmitting data through the communication network 12.

FIG. 2 illustrates a graphical representation of merging multiple virtual connections 120 to produce a merged virtual connection 142. As shown, the endpoint switch 140 is operably coupled to a plurality of virtual connections (A-D) 120. The merged virtual connection 142 is formed from the plurality of virtual connections 120 and transports data through the intervening switch(es) 150 to the endpoint switch 160. At the endpoint switch 160 data received from the endpoint switch 140 via the merged virtual connection 142 is separated to recreate the data streams of the individual virtual connections 120. Note that data transmission may occur in both directions such that the end point switch 160 may also perform the tasks associated with combining multiple virtual connection data streams to produce a data stream carried via the merged virtual connection 142 to the endpoint switch 140.

The endpoint switch 140 includes the buffers 80, 90, 100, and 110, where each of the buffers corresponds to one of the virtual connections 120. As cells are received via the virtual connections 120 they are buffered into a corresponding buffer. Thus, cells received on the virtual connection A are stored in the buffer A 80. Cells received over the virtual connections 120 are portions of packets. Each of the cells received along each of the virtual connections 120 includes a virtual connection identifier (VCI) that indicates to which virtual connection the particular cell corresponds. When the merged virtual connection 142 is created from the virtual connections 120, the VCIs included within each of the cells corresponds to the merged virtual connection 142, and no longer identifies to which of the plurality of virtual connections 120 the cell corresponds. As such, the cells corresponding to a particular packet are included in the cell stream 70 of the merged virtual connection 142 in a continuous manner. Information is included in the merged cell stream 70 that indicates the particular virtual connection to which each packet corresponds. Thus, entire packets are sent across the merged virtual connection 142 as whole entities, and the individual cells corresponding to different packets are not intermingled.

Because entire packets are included as sequential, uninterrupted cells in the cell stream 70 corresponding to the merged virtual connection 142, the control circuitry which arranges the cell stream 70 must be notified when entire packets have been buffered and are available for inclusion in the cell stream 70. In order to determine when enough cells had been received that constitutes a complete packet, the cells stored in each of the buffers are monitored to detect an end of message (EOM) indication that indicates a final cell for a complete packet. A queue structure is created within which the identity of a particular virtual connection is included once an entire packet for that virtual connection has been buffered. For example, when the entire packet 82 corresponding to the virtual connection A has been stored in the buffer A 80, the identity of the virtual connection A will be included in the queue structure such that the control circuitry generating the cell stream 70 will be informed that there is a complete packet in buffer A 80 for transmission.

Preferably, the control circuitry that generates the cell stream 70 includes packets ready for transmission in the cell stream 70 based on prioritization information 170 that indicates how the available bandwidth in the merged virtual connection 142 is allocated. A simple allocation technique may include the priority level for each of the virtual connections 120 in the prioritization information 170. As such, when a particular packet has been fully buffered, it will be included in the cell stream 70 based on the prioritization information 170 corresponding to the virtual connection over which it arrived.

For example, if the prioritization information 170 indicates that the virtual connection A has a higher priority than the virtual connection B for a particular portion of the cell stream 70, if a packet is available for transmission in the buffer A 80, it will be sent preferentially over any packets available for transmission in the buffer B 90. The prioritization information 170 may include a simple round-robin structure that evenly distributes the available bandwidth within the cell stream 70.

In a more complex prioritization system, each of the virtual connections 120 has a corresponding class assignment, where the class differentiation may be based on the cost associated with the virtual connection, the type of data traffic carried by the virtual connection, the end user corresponding to the virtual connection, etc. Such differentiation between different classes of service is preferable in communications network such that the needs of a variety of users can be met in an efficient manner. In order to allocate the available bandwidth on the merged virtual connection 142 based on a class system, a number of individual class queues 130, 132, and 134 may be included in the queue that indicates which buffers have complete data packets for transmission. Through the use of the class queues 130, 132, and 134, the bandwidth distribution for the merged virtual connection 142 may be performed based on the class of the various virtual connections 120, whereas, in other embodiments the bandwidth distribution was based on the individual identity of the virtual connection 120.

In the example illustrated, the virtual connection A is a third class virtual connection (i.e. assigned to the third class), the virtual connection C is a second class virtual connection, and the virtual connections B and D are first class virtual connections. As such, when complete packets for the virtual connection A are buffered in the buffer A 80, the identity of the virtual connection A is included in the third class queue 134. Preferably, each of the class queues 130, 132, and 134 is implemented as a linked list structure such that the addition of the identity of a particular virtual connection to the queue merely requires appending the identity of the virtual connection to a tail of the appropriate linked list. Linked list structures are well known in the art.

In order to generate the cell stream 70 corresponding to the merged virtual connection 142, the endpoint switch 140 accesses the prioritization information 170 to determine which of the various classes has priority for each particular interval, or portion of the cell stream 70. The prioritization information 170 illustrated in FIG. 2 shows a distribution of bandwidth that allocates one half of the bandwidth of the merged virtual connection 142 to the first class, one third of the bandwidth to the second class, and one sixth of the bandwidth to the third class. The access sequence illustrated in the prioritization information 170 shows a pointer to a table, where the table stores the identity of the particular class that has highest priority for a particular interval. As the various intervals within the cell stream 70 are completed, the pointer to the table steps downward such that the next interval priority class can be determined. When the bottom of the table is reached, the pointer returns to the top of the table. Thus in the greatly simplified example shown, the first class has the priority for intervals one, three and five, the second class has priority for intervals two and four, and the third class has priority during interval six.

Assuming that each of the classes continuously has data that is ready to transmit (complete packets), the bandwidth available over the merged virtual connection 142 will be allocated amongst the various classes based on the prioritization information 170. If a particular class does not have data to transmit during a particular interval for which it has priority, the priority for that interval may revert to the highest priority class (the first class in this example) or may cause the pointer within the prioritization information table to increment. Thus, if during interval five the first class has no complete packets to transmit, in one embodiment, the priority for that interval reverts to the second class as the next highest priority class is granted priority for that interval. In another embodiment, priority reverts to the third class as the pointer within the prioritization table increments (steps downward) such that it points to interval six (for which the third class has highest priority).

Note that the interval lengths within the cell stream 70 may be based on a number of cells or a number of packets that are permitted to be transmitted by a particular class during a particular interval. For example, each interval may allow for a single packet to be transmitted. Thus, during the first interval, a packet corresponding to a first class virtual connection would be transmitted, and at the completion of that packet the next class having priority as determined by the prioritization information 170 would provide a packet for transmission.

In other embodiments, a number of packets could be transmitted during each interval. Thus, when a particular class has priority, a predetermined number of packets corresponding to that class are included in the cell stream 70. Note that the number of packets included in the cell stream 70 for an interval in such an embodiment may be based on the class that currently has priority. For example, when the first class has priority up to three packets are included in the cell stream 70, whereas when the third class has priority only a single packet is included.

Because the number of cells included in a particular packet can vary, a more balanced distribution of bandwidth may be achieved by including a cell counter with respect to interval determination. For example, for each interval a certain number of cells may be included in the cell stream 70 before the end of a packet (as flagged by an EOM indication) is used as an interval delineation. Thus, if a 100 cells are guaranteed per interval and a certain class includes three packets that are each 40 cells in length, the first two packets would be sent without any concern for their end of packet indications, whereas once the 100th cell was included in the cell stream 70 (which would occur in the middle of the third packet) the next end of packet indication would flag the end of that particular interval. By using a particular number of cells to help delineate between intervals within the cell stream 70, the length of packets becomes less important in determining how the overall bandwidth for the merged virtual connection 142 is allocated.

As stated earlier, the greatly simplified example shown in FIG. 2 has four virtual connections A-D. The virtual connection A is a virtual connection that corresponds to the third class. In the particular example illustrated, the buffer A 80 is shown to include two complete packets 82 and 84 and a number of cells 86 that make up a portion of an additional packet. As stated earlier, the delineation between the packets is preferably determined based on an EOM indication that flags the final cell for a packet. Once the complete packet has been stored in the buffer A 80, the identity of the virtual connection A is added to the queue corresponding to the class to which the virtual connection A belongs. Thus, the third class queue 134 is shown to include two instances of the identity of the virtual connection A.

In some embodiments, each virtual connection may only be allowed to include its identity within the class queue a certain number of times. Thus, if the virtual connection A was only allowed to store its identity in the third class queue 134 a single time, only one instance of the identity of the virtual connection A would exist within the third class queue. Such limitations on the inclusion of the identity of various virtual connections within the class queues ensures that the bandwidth allocated to a certain class is fairly evenly distributed with respect to the virtual connections included in that class. For example, if an additional virtual connection also was a third class connection and received a large number of packets in quick succession, it could affectively monopolize the third class queue 134 such that other virtual connections, such as the virtual connection A, would not receive any service for an extended period of time. As is apparent to one of ordinary skill in the art, various prioritization schemes could be used in association with the general methodology described herein to satisfy the bandwidth allocation needs of a particular system.

The buffer B 90 is shown to include a complete packet 92 and a number of cells 94 that make up a portion of an additional packet. Because the buffer B 90 stores one complete packet 92, one instance of the identity of the virtual connection B is included in the first class queue 130, as the virtual connection B is a member of the first class.

The buffer C 100 is shown to only include a number of cells 102 that make up a portion of a packet. For this example, the virtual connection C is assumed to be a second-class connection. Because the virtual connection C is the only second-class connection, and the buffer C 100 does not yet include a complete packet, the queue corresponding to the second class 132 does not contain the identity of any virtual connections. Thus, when the second class has priority, no second class packets are available for inclusion in the cell stream 70 and another one of the classes will be reverted to during that interval.

The buffer D 110 is shown to include one complete packet 112. The buffer D corresponds to the virtual connection D that is assumed in this example to be a first class connection. The first class queue 130 shows the identity of the virtual connection D to be located at the tail of the linked list that may be used as the first-class queue. As such, it should be apparent that the packet 112 was fully assembled in the buffer D 110 subsequent in time to the packet 92 and the buffer B 90. Thus, the identity of the virtual connection B was included in the first-class queue 130 prior to the identity of the virtual connection D.

Assuming that the prioritization information 170 (which may be stored in a prioritization table) as illustrated in FIG. 2 is used in determining the packets included in the cell stream 70, the cell stream 70 is shown to include the packets 92, 112, 82, and 84 that have been received via the virtual connections 120. In the simplified example illustrated, it is assumed that each interval is determined based on the inclusion of a single packet in the cell stream 70. Thus, the pointer within the table of the prioritization information 170 will step based on the inclusion of each packet.

During the first interval, the first class has priority. As such, the virtual connection identifier at the head of the linked list that represents the first class queue 130 is used to dequeue the cells corresponding to a complete packet stored within the buffer corresponding to the virtual connection as identified by the virtual connection identifier. As is illustrated, the head of the first class queue 130 stores the identity of the virtual connection B. Thus, the cells corresponding to the packet 92 are dequeued from the buffer B 90 and included in the cell stream 70.

During the next interval, the second-class has priority as indicated by the prioritization information 170. As noted earlier, the second class queue 132 indicates that there are no second class packets for inclusion in the cell stream 70 at this time. As such, the priority for the second interval will either revert to the class having the highest priority (the first class) or the class having the priority for the next interval (also the first class). As such, the subsequent identity included in the first class queue 130 is used to dequeue the cells that make up the packet 112 as currently stored in the buffer D 110. The cell stream 70 shows that the packet 112 is included for the second interval.

In the third interval, the first class has priority as indicated by the prioritization information 170. However, all of the packets corresponding to virtual connections included in the first class have been transmitted at this time. As such, packets corresponding to lower priority classes are included in the cell stream 70. Because the only remaining packets correspond to the third class, the packet 82 as stored in the buffer A 80 is dequeued and included in the cell stream 70. During the fourth interval, the same situation occurs, and the packet 84 is dequeued and included in the cell stream 70.

Note that the cell stream 70 includes the various packets in their entirety such that cells corresponding to different packets are not intermingled. This ensures that the reconstruction of the data streams for the various virtual connections can be performed by the endpoint switch 160. Because each cell included in the cell stream 70 does not include a virtual connection identifier that corresponds to its original virtual connection identity, but rather includes a virtual connection identifier that corresponds to the merged virtual connection 142, the parsing performed by the endpoint switch 160 may be corrupted if cells from various packets are intermingled in the cell stream 70.

Figure 3:
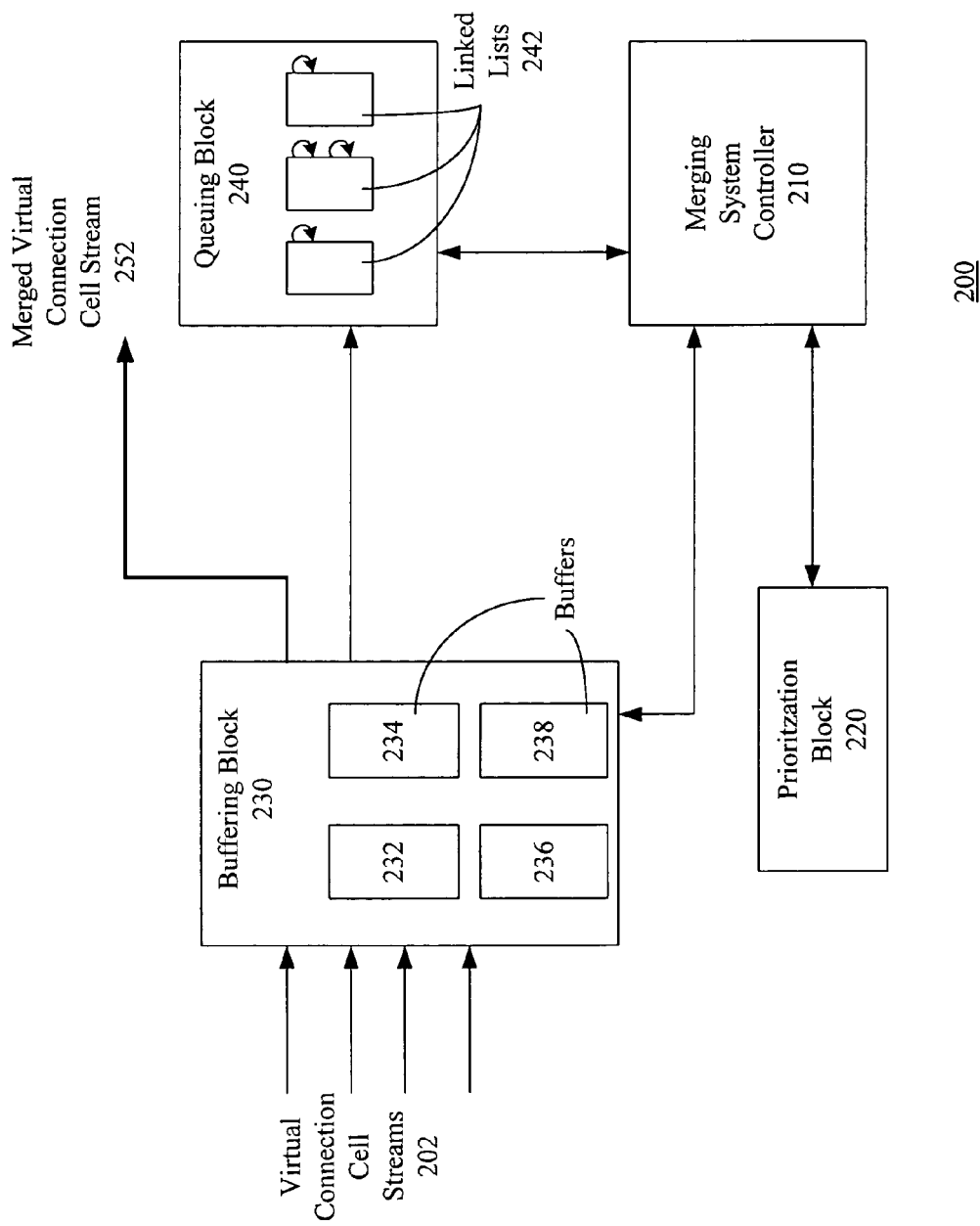
FIG. 3 illustrates a block diagram of a virtual connection merging system in accordance with a particular embodiment of the present invention.

FIG. 3 illustrates a block diagram of a virtual connection merging system 200. The virtual connection merging system 200 includes a buffering block 230, a queuing block 240, a prioritization block 220, and a merging system controller 210. The virtual connection merging system receives a plurality of virtual connection cell streams 202 corresponding to a plurality of virtual connections. The packets contained within the virtual connection cell streams are then buffered within the buffering block 230 before being combined to form the merged virtual connection cell stream 252.

The buffering block 230 preferably includes a plurality of buffers 232, 234, 236, and 238 where each buffer of the plurality of buffers corresponds to a particular virtual connection. Each of the virtual connections has a unique virtual connection identifier, and each cell for that particular virtual connection as received by the buffering block 230 includes the virtual connection identifier of its corresponding virtual connection. The cells received for each of the plurality of virtual connections are buffered in a corresponding one of the buffers 232, 234, 236, and 238.

The queuing block 240 is operably coupled to the buffering block 230 and stores identities of virtual connections that have complete packets buffered in the buffering block 230. A complete packet includes a plurality of cells, where the final cell of a packet preferably includes an EOM indication. In one embodiment, the queuing block 240 includes a plurality of linked lists 242 where each of the linked lists corresponds to a particular class. Each of the virtual connections that are combined to form the merged virtual connections belongs to one of the classes. When a complete packet for a particular virtual connection has been buffered, its identity is appended to the linked list of the class to which that particular virtual connection corresponds.

The merging system controller 210 which is operably coupled to the buffering block 230, the queuing block 240, and a prioritization block 220, dequeues cells from the plurality of buffers based on prioritization information stored in the prioritization block 220 to produce the merged virtual connection cell stream 252. Preferably, the prioritization information included in the prioritization block 220 includes prioritization information that prioritizes inclusion of packets in the merged virtual connection cell stream 252 based on class. Such prioritization information may be stored in a table or similar format. Thus, certain classes to which the various virtual connections may correspond may receive preferential treatment with respect to their allocation of available bandwidth in the merged virtual connection cell stream 252.

The merging system controller 210 retrieves the prioritization information from the prioritization block 220 and uses the prioritization information in conjunction with the identities of the various virtual connections that are currently stored within the queuing block 240. Thus, the merging system controller 210 bases its dequeuing of cells from the buffering block 230 on the prioritization information and information from the queuing block 240 as to which virtual connections have complete packets buffered within the buffering block 230. The dequeuing of cells by the merging system controller 210 is performed in a manner such that cells corresponding to different packets are not intermingled in the merged virtual connection cell stream 252. As described earlier, this is because each of the individual cells does not retain its virtual connection identifier corresponding to its original virtual connection. Instead, each of the cells in the merged virtual connection cell stream 252 will include a virtual connection identifier that corresponds to the merged virtual connection.

The dequeuing of cells from the buffering block 230 by the merging system controller 210 is preferably performed in intervals, where different classes receive priority for different intervals. The delineation between different intervals may be based on a number of different quantitative measures. For example, as described earlier, intervals may be divided by a particular number of packets such that once the particular number of packets have been included in the merged virtual connections cells stream 252 for that interval, the following EOM indication that flags the end of a packet will signal the end of that particular interval. In another example, a number of cells may be used to delineate between intervals, such that when the particular number of cells selected has been included for an interval in the merged virtual connection cell stream 252, the following EOM indication that flags the end of the packet will also indicate the end of that particular interval.

Merging a plurality of virtual connections into a single merged virtual connection may be advantageous at different portions of a communication switch. In one embodiment, the merging of the virtual connections is accomplished in the ingress portion of a communication switch. Merging the virtual connections at the ingress portion of the switch reduces the number of virtual connections that must be maintained within the switch as well as at the egress portion of the switch. If the merging of the virtual connections occurs in the egress portion of the switch, the virtual connections that are merged must still be maintained within the switch.

Note that the merged virtual connection may be included in a port of the communication switch that is also servicing other virtual connections. As such, cells from the merged virtual connection may be intermingled with cells from other virtual connections. Because the individual cells of the merged virtual connection are clearly identified by the VCI corresponding to the merged virtual connection, intermingling of cells of the merged virtual connection with those of other virtual connections does not create any problems.

Figure 4:
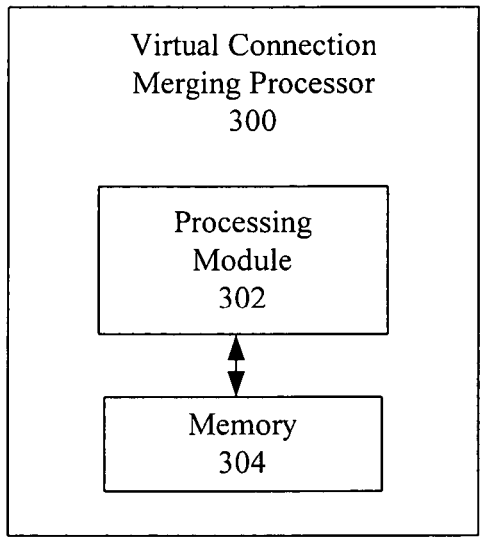
FIG. 4 illustrates a block diagram of a virtual connection merging processor in accordance with a particular embodiment of the present invention.

FIG. 4 illustrates a virtual connection merging processor 300 that may be included in a communication switch in order to perform the virtual connection merging functions. The virtual connection merging processor 300 includes a processing module 302 and memory 304. The processing module 302 may be a single processing device or a plurality of processing devices. Such a processing device may be a microprocessor, microcontroller, digital signal processor, microcomputer, state machine, logic circuitry, or any device that processes information based on operational or programming instructions.

The memory 304 may be a single memory device or a plurality of memory devices. Such a memory device may be a read only memory device, random access memory device, floppy disk, hard drive memory, or any device that stores digital information. Note that when the processing module 302 has one or more of its functions performed by a state machine or logic circuitry, the memory containing the corresponding operational instructions is embedded within the state machine or logic circuitry.

Figure 5:
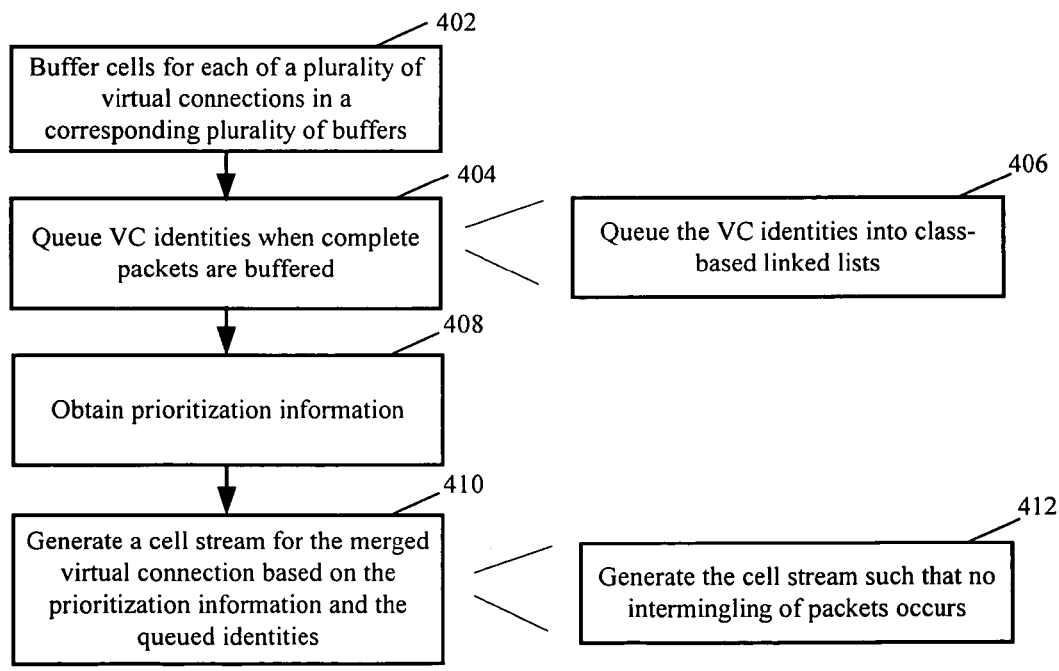
FIG. 5 illustrates a flow diagram of a method for merging a plurality of virtual connections to form a merged virtual connection in accordance with a particular embodiment of the present invention.

The memory 304 stores programming or operational instructions that, when executed by the processing module 302, cause the processing module 302 to perform at least a portion of the steps of the method illustrated in FIG. 5. Note that the virtual connection merging processor 300 may implement some of the functions of the method of FIG. 5 through the use of software stored in the memory 304, whereas other portions of the method of FIG. 5 may be implemented using hardware or circuitry included within the virtual connection merging processor 300. Thus, in some embodiments, a mix of hardware and software may be used to perform the method illustrated in FIG. 5.

FIG. 5 illustrates a method for merging a plurality of virtual connections to form a merged virtual connection. The method begins at step 402 where cells corresponding to a plurality of virtual connections are buffered into a corresponding plurality of cell buffers. Each of the virtual connections has a corresponding cell buffer. Each of the plurality of virtual connections has a virtual connection identifier, and cells for that particular virtual connection are identified by the inclusion of the virtual connection identifier.

At step 404, the identity of a virtual connection that has received enough cells to constitute a complete packet is queued in a queue. Determining that enough cells have been buffered to form a complete packet can be determined based on the detection of an EOM indication as described earlier. The EOM indication indicates the final cell for a complete packet. Preferably, the queue includes a plurality of queues, where each of the plurality of queues corresponds to a particular class. Each of the virtual connections in turn corresponds to one of the classes such that when a virtual connections identity is pushed into the queue, it is pushed into the appropriate class queue for that virtual connection. More preferably, each of the plurality of queues is a linked list structure such that when a virtual connection identity is added to a particular queue it is simply appended to the tail of the linked list structure for that class. This is illustrated by step 406.

At step 408, prioritization information for forming the merged virtual connection is obtained. Preferably, the prioritization information prioritizes the bandwidth distribution for the merged virtual connection based on the various classes to which the virtual connections may belong. It should be apparent to one of ordinary skill in the art that a variety of prioritization schemes could be used to divide the bandwidth available over the merged virtual connection to the plurality of virtual connections that are merged to form the merged virtual connection. One example is the use of a prioritization table that stores an accessing sequence for the plurality of queues. Such an accessing sequence was illustrated in the prioritization information 170 of FIG. 2.

At step 410, a cell stream for the merged virtual connection is generated based on the prioritization information and the virtual connection identities that are stored in the queue structure. In order to generate the cell stream, cells currently stored in the plurality of buffers are dequeued based on the prioritization information. Each of the cells included in the cell stream for the merged virtual connection carries a VCI that corresponds to the merged virtual connection. As described earlier, this requires that cells corresponding to different packets to be included in the merged virtual connection are included in a non-intermingled format at step 412. Thus, entire packets are included in the merged virtual connection cell stream in a consecutive manner without interruption.

Once the merged virtual connection cell stream has been created, it may be combined with cell streams for one or more additional virtual connections at a port or other portion of a communication switch. Thus, the physical resources used to transport the merged virtual connection cell stream may also be used to transport other cell streams corresponding to other connections. Because the individual cells within the merged virtual connection carry the VCI corresponding to the merged virtual connection, there is no problem in identifying which cells correspond to the merged virtual connection in the intermingled cell stream. This is because the VCIs corresponding to the additional virtual connections are different than the merged virtual connection identifier.

The buffering structure, queuing structure, and prioritization system described herein enables a plurality of virtual connections to be merged to form a single merged virtual connection in an efficient manner. The combination can be performed such that the bandwidth availability on the merged virtual connection is distributed according to a variety of different prioritization schemes. The inclusion of classes to which the various virtual connections can belong allows for distribution of bandwidth based on class membership. Such bandwidth distribution capabilities enable the various classes and qualities of service that are commonly associated with communication networks to be made available to a variety of end users that may have different needs.

It should be understood that the implementation of variations and modifications of the invention in its various aspects should be apparent to those of ordinary skill in the art, and that the invention is not limited to the specific embodiments described. It is therefore contemplated to cover by the present invention any and all modifications, variations, or equivalents that fall within the spirit and scope of the basic underlying principles disclosed and claimed herein.

What is claimed is:

1. A method for merging a plurality of virtual connections to form a merged virtual connection, comprising:
    buffering data of each of the plurality of virtual connections into a corresponding one of a plurality of buffers, wherein each of the plurality of virtual connections is identified by an identifier, wherein each of the plurality of virtual connections is included in a class of a plurality of classes;
    queuing an identity of a virtual connection in a queue when data that constitute a complete packet are buffered in a corresponding buffer, wherein the queue includes a plurality of queues, wherein each of the plurality of queues corresponds to a class of the plurality of classes, wherein queuing the identity of a virtual connection further comprises queuing the identity of the virtual connection into a corresponding one of the plurality of queues based on class of the virtual connection;
    obtaining prioritization information for the merged virtual connection, wherein the prioritization information includes class prioritization information; and
    generating a data stream for the merged virtual connection based on the prioritization information and virtual connection identities stored in the queue, wherein the merged virtual connection is identified by a merged identifier, wherein each unit of data in the data stream includes the merged identifier.

2. The method of claim 1, wherein generating the data stream for the merged virtual connection further comprises dequeuing data from the plurality of buffers to produce the data stream, wherein dequeuing of the data is based on the prioritization information.

3. The method of claim 1, wherein each of the plurality of queues is a linked list, wherein queuing the identity of a virtual connection further comprises appending the identity of the virtual connection to a tail of a corresponding one of the linked lists based on class of the virtual connection.

4. The method of claim 1, wherein the prioritization information allocates available bandwidth on the merged virtual connection based on class.

5. The method of claim 1, wherein obtaining prioritization information further comprises referencing a prioritization table that stores an accessing sequence for the plurality of queues.

6. The method of claim 1, wherein generating the data stream further comprises generating the data stream such that data corresponding to different packets that are combined to produce the merged virtual connection are not intermingled.

7. The method of claim 1, wherein determining that data that constitute a complete packet are buffered further comprises detecting an end of message indication that indicates a final unit of data for the complete packet.

8. The method of claim 1 further comprises generating a data stream for a port by combining the data stream for the merged virtual connection with a data stream corresponding to an additional virtual connection, wherein the identifier corresponding to the additional virtual connection is different than the merged identifier.

9. The method of claim 1 wherein the queuing the identity of the virtual connection in the queue when data that constitute the complete packet are buffered in the corresponding buffer further comprises:
    limiting a number of times the identity of the virtual connection may be queued in the queue.

10. The method of claim 1 wherein the generating the data stream for the merged virtual connection further comprises:
    when a first class of the plurality of classes does not have data to transmit during a particular interval for which it has priority, reverting the priority for the particular interval to a highest priority class.

11. The method of claim 1 wherein the generating the data stream for the merged virtual connection further comprises:
    when a first class of the plurality of classes does not have data to transmit during a particular interval for which it has priority, incrementing a pointer within a prioritization information table.

12. A virtual connection merging system, comprising:
    a plurality of buffers, wherein each buffer of the plurality of buffers corresponds to a virtual connection of a plurality of virtual connections, wherein each of the plurality of virtual connections has a unique identifier, wherein data received for each of the plurality of virtual connections are buffered in corresponding buffers of the plurality of buffers;
    a queuing block that stores identities of virtual connections that have complete packets buffered in the plurality of buffers, wherein a complete packet includes a plurality of units of data, wherein the queuing block comprises a plurality of queues corresponding to a plurality of classes, wherein each of the virtual connections corresponds to one of the plurality of classes, wherein the identities of the virtual connections for which complete packets are buffered are stored in corresponding queues of the plurality of queues based on class;
    a prioritization block that stores prioritization information; and
    a merging system controller operably coupled to the plurality of buffers, the queuing block, and the prioritization block, wherein the merging system controller dequeues data from the plurality of buffers based on the prioritization information and the identities stored in the queuing block to produce a data stream corresponding to a merged virtual connection, wherein data are dequeued from the plurality of buffers by the merging system controller such that data from a packet are included in a continuous portion of the data stream for the merged virtual connection, wherein data included in the data stream for the merged virtual connection include an identifier corresponding to the merged virtual connection.

13. The virtual connection merging system of claim 12, wherein the plurality of queues further comprises a plurality of linked lists, wherein when data that constitute a complete packet are buffered in one of the plurality of buffers, identity of a particular virtual connection to which the complete packet corresponds is added to a tail of the linked list for a class to which the particular virtual connection corresponds.

14. The virtual connection merging system of claim 12, wherein the prioritization information stored in the prioritization block prioritizes inclusion of packets in the data stream for the merged virtual connection based on class.

15. The virtual connection merging system of claim 14, wherein the prioritization information causes transitions between classes for dequeuing based on at least one of: a number of packets for a particular class included in the data stream for the merged virtual connection and a number of units of data for a particular class included in the data stream for the merged virtual connection.

16. The virtual connection merging system of claim 12, wherein the virtual connection merging system is included in the ingress portion of a communication switch.

17. The virtual connection merging system of claim 12, wherein the virtual connection merging system is included in the egress portion of a communication switch.

18. A virtual connection merging processor, comprising:
a processing module; and
memory operably coupled to the processing module, wherein the memory stores operating instructions that, when executed by the processing module, cause the processing module to perform the functions of:
buffering data of each of a plurality of virtual connections into a corresponding one of a plurality of buffers, wherein each of the plurality of virtual connections is identified by a identifier, wherein each of the plurality of virtual connections is included in a class of a plurality of classes;
queuing an identity of a virtual connection in a queue when data that constitute a complete packet are buffered in a corresponding buffer, wherein the queue includes a plurality of queues, wherein each of the plurality of queues corresponds to a class of the plurality of classes, wherein the processing module queues the identity of a virtual connection by queuing the identity of the virtual connection into a corresponding one of the plurality of queues based on class of the virtual connection;
obtaining prioritization information for the merged virtual connection, wherein the prioritization information includes class prioritization information; and
generating a data stream for a merged virtual connection based on the prioritization information and virtual connection identities stored in the queue, wherein the merged virtual connection is identified by a merged identifier, wherein each unit of data in the data stream includes the merged identifier.

19. The virtual connection merging processor of claim 18, wherein the memory further comprises operating instructions that, when executed by the processing module, cause the processing module to generate the data stream for the merged virtual connection by dequeuing data from the plurality of buffers to produce the data stream, wherein dequeuing of the data is based on the prioritization information.

20. The virtual connection processor of claim 18, wherein each of the plurality of queues is a linked list, wherein the processing module queues the identity of a virtual connection by appending the identity of the virtual connection to a tail of a corresponding one of the linked lists based on class of the virtual connection.

21. The virtual connection processor of claim 18, wherein the prioritization information allocates available bandwidth on the merged virtual connection based on class.

22. The virtual connection processor of claim 18, wherein the processing module obtains prioritization information by referencing a prioritization table that stores an accessing sequence for the plurality of queues.

23. The virtual connection processing module of claim 18, wherein the memory further comprises operating instructions such that the processing module performs the function of generating the data stream such that data corresponding to different packets that are combined to produce the merged virtual connection are not intermingled.

24. The virtual connection processing module of claim 18, wherein the memory further comprises operating instructions such that the processing module determines that data that constitute a complete packet are buffered by detecting an end of message indication that indicates a final data element for the complete packet.

25. A method for merging a plurality of virtual connections to form a merged virtual connection, comprising:
buffering data of each of the plurality of virtual connections into a corresponding one of a plurality of buffers, wherein each of the plurality of virtual connections is identified by a identifier, wherein each of the plurality of virtual connections is included in a class of a plurality of classes;
queuing an identity of a virtual connection in a queue when data that constitute a complete packet are buffered in a corresponding buffer, wherein the queue includes a plurality of queues, wherein each of the plurality of queues corresponds to a class of the plurality of classes, wherein queuing the identity of a virtual connection further comprises queuing the identity of the virtual connection into a corresponding one of the plurality of queues based on class of the virtual connection;
obtaining prioritization information for the merged virtual connection, wherein the prioritization information includes class prioritization information; and
generating a data stream for the merged virtual connection based on the prioritization information and virtual connection identities stored in the queue, wherein the merged virtual connection is identified by a merged identifier, wherein each unit of data in the data stream includes the merged identifier, wherein dequeuing of data is performed in intervals, where different classes receive priority for different ones of the intervals.

26. The method of claim 25, wherein generating the data stream for the merged virtual connection further comprises dequeuing data from the plurality of buffers to produce the data stream, wherein dequeuing of the data is based on the prioritization information.

27. The method of claim 25, wherein each of the plurality of queues is a linked list, wherein queuing the identity of a virtual connection further comprises appending the identity of the virtual connection to a tail of a corresponding one of the linked lists based on class of the virtual connection.

28. The method of claim 25, wherein the prioritization information allocates available bandwidth on the merged virtual connection based on class.

29. The method of claim 25, wherein obtaining prioritization information further comprises referencing a prioritization table that stores an accessing sequence for the plurality of queues.

30. The method of claim 25, wherein generating the data stream further comprises generating the data stream such that data corresponding to different packets that are combined to produce the merged virtual connection are not intermingled.

31. The method of claim 25, wherein determining that data that constitute a complete packet are buffered further comprises detecting an end of message indication that indicates a final unit of data for the complete packet.

32. The method of claim 25 further comprises generating a stream for a port by combining the data stream for the merged virtual connection with a data stream corresponding to an additional virtual connection, wherein the identifier corresponding to the additional virtual connection is different than the merged identifier.

33. The method of claim 25 wherein generating the data stream for the merged virtual connection based on the prioritization information and the virtual connection identities stored in the queue further comprises:

transmitting a number of packets during each interval of the intervals, wherein when a particular class has priority, including a predetermined number of packets corresponding to that class in the data stream.

* * * * *